United States Patent [19]

Henderson

[11] Patent Number: 4,665,385

[45] Date of Patent: May 12, 1987

[54] HAZARDOUS CONDITION MONITORING SYSTEM

[76] Inventor: Claude L. Henderson, 5546 Kentucky Ave., Indianapolis, Ind. 46241

[21] Appl. No.: 698,398

[22] Filed: Feb. 5, 1985

[51] Int. Cl.[4] .......................... G08B 1/08; H04Q 7/00; G01N 1/22

[52] U.S. Cl. .................................... 340/539; 340/521; 340/531; 340/532; 340/555; 340/573; 340/576; 340/632; 128/719; 422/84; 455/53; 455/67; 455/89; 73/23; 250/497.1

[58] Field of Search ............... 340/539, 517, 521, 531, 340/555, 556, 573, 576, 632-634, 532; 455/53, 54, 67, 88, 89, 90, 95, 100, 228; 11/11; 180/271, 272; 128/719, 730; 307/10 R, 326; 73/23, 23.1; 422/84, 83, 98; 250/493.1, 497.1, 496.1

[56] References Cited

U.S. PATENT DOCUMENTS

| | | | |
|---|---|---|---|
| 3,440,635 | 4/1969 | Hull | 340/539 |
| 3,573,817 | 4/1971 | Akers | 340/539 |
| 3,668,526 | 6/1972 | Raskin | 340/539 |
| 3,678,391 | 7/1972 | Gough | 455/38 |
| 4,468,656 | 8/1984 | Clifford et al. | 340/539 |
| 4,507,654 | 3/1985 | Stolarczyk et al. | 340/556 |
| 4,539,557 | 9/1985 | Redshaw | 340/539 |

FOREIGN PATENT DOCUMENTS

| | | | |
|---|---|---|---|
| 2703923 | 8/1978 | Fed. Rep. of Germany | 340/539 |

OTHER PUBLICATIONS

1976 Carnahan Conferences on Crime Countermeasures, Lexington, Ky., 1976, pp. 57-71.

*Primary Examiner*—Donnie L. Crosland
*Attorney, Agent, or Firm*—Roger M. Rickert

[57] ABSTRACT

Hazardous condition warning indications are transmitted from a site to a remote location on a conventional audio communication link. A variety of hazardous conditions including unconsciousness or inebriation of a workman at the site or his exposure to dangerous materials may be sensed and identifying information indicative of the source or location of the irregularity sensed may be transmitted to the remote location. A convention hand-held transceiver equipped with hazardous material sensors and sensors responsive to indications of potential impaired functioning of the individual are illustrated as an exemplary embodiment.

9 Claims, 7 Drawing Figures

HAZARDOUS CONDITION MONITORING SYSTEM

SUMMARY OF THE PRESENT INVENTION

The present invention relates generally to systems for monitoring for the presence of potentially hazardous conditions and upon the detection of such conditions for providing warning indications either locally or remote to indicate the presence of the hazardous condition and more particularly to such monitoring schemes used in conjunction with pre-existing voice communication systems.

There are currently commercially available a wide variety of, typically hand-held, solid state devices for detecting gas leaks or for the presence of combustible gases. For example, U.S. Pat. No. 4,352,087 illustrates such an arrangement employing a sensing device which responds to a variety of contaminating gases or fumes as well as responding to a depletion of oxygen within the atmosphere being monitored to sound an audible alarm at the location of the device.

Remote condition monitoring systems generally are quite well known including for example hospital monitoring of patient vital signs, telemetry systems monitoring many different parameters of astronauts or spacecraft, railway centralized control systems, and a vast variety of production controls in manufacturing systems. Such known remote monitoring techniques are generally tailored in their entireties to the particular environment being monitored.

Gas analyzing devices and vapor sensitive switches along with vital sign monitoring transducers and unusual attitude tilt switching devices have been employed as remote condition sensors wherein an abnormality is transmitted by a dedicated radio transmitter to a remote receiver. Illustrative of these types of schemes are U.S. Pat. Nos. 3,406,342 and 4,331,953. Such systems do not provide for conventional communication.

Also generally well known are a wide variety of voice communication systems including, for example, conventional telephone systems, fixed or mobile two way radio communication systems and portable or hand-held transceiver communication networks. In addition to military applications such hand-held transceivers are frequently carried by policemen, firemen and other individuals who are at one time or another exposed to potentially hazardous conditions. In these situations, transmission notifying others of the existence of a potentially hazardous condition is dependent upon the individual actuating the transceiver in its normal mode of operation. If the individual is incapacitated, the existence of the hazardous condition may not be communicated to others both to the detriment of the individual exposed to the hazardous condition and potentially to the detriment of others who might otherwise have been forewarned of its existence.

Among the several objects of the present invention may be noted the provision of a hazardous condition warning system suitable for incorporation into a pre-existing voice communication network; the provision of an adjunct to a portable radio transceiver which monitors the transceiver environment for unusual conditions and provides both remote and local alarm indications in the event such unusual conditions are sensed; the provision of an arrangement for detecting an impaired function condition of an individual and transmitting the existence of that condition to a remote location; the provision of an arrangement for transmitting signals indicative of potentially hazardous conditions at a given location with the particular signal transmitted being indicative of the location or particular type hazardous condition encountered; the provision of a remote indicating consciousness monitoring system; and an overall improvement in voice communications systems for transmitting, receiving and displaying information in addition to the information periodically intentionally transmitted by an individual. These as well as other objects and advantageous features of the present invention will be in part apparent and in part pointed out hereinafter.

In general, an arrangement utilizing a voice communication system monitors for potentially dangerous conditions at one end of the system and reports the existence of such conditions to another end of the system by providing a condition sensor and an arrangement for generating a signal identifying the sensor with that identifying signal being transmitted over the voice communication system upon detection by the sensor of a potentially dangerous condition.

Also in general, and in one form of the invention, a voice communication system has an irregularity sensing and warning arrangement including a transducer which continually monitors for the presence of a particular irregularity providing an output indication upon the sensing of such irregularity. Upon the sensing of such an irregularity, a warning indication is provided at the location of the transducer and another warning indication is transmitted by way of the voice communication system to a location remote from the transducer.

Still further in general and in one form of the invention, an arrangement for monitoring the conscious state of an individual and for providing an alarm in the event an unconscious condition is detected includes a radiation source and a radiation detector positioned closely adjacent one another but shielded so as to be uneffected by any direct radiation from the source to the detector. An indirect path from the source to the detector includes a portion of an individual's anatomy so that movement of that anatomy portion varies the radiation received by the detector. If the detector receives a steady level of radiation for a predetermined time interval indicating a lack of movement of the anatomy portion during that time interval, an alarm indication is generated.

Further in general and in one form of the invention, a microphone associated with a voice communication system such as radio or telephone has an alcohol level sensitive transducer associated therewith to test the alcohol level of the breath of an individual speaking into that microphone along with an arrangement for transmitting data identifying the user or microphone source over the voice communication system to a remote location upon an indication by the transducer that the alcohol level is excessive.

The above-mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

In the drawings.

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERED EMBODIMENT

Figure 1:
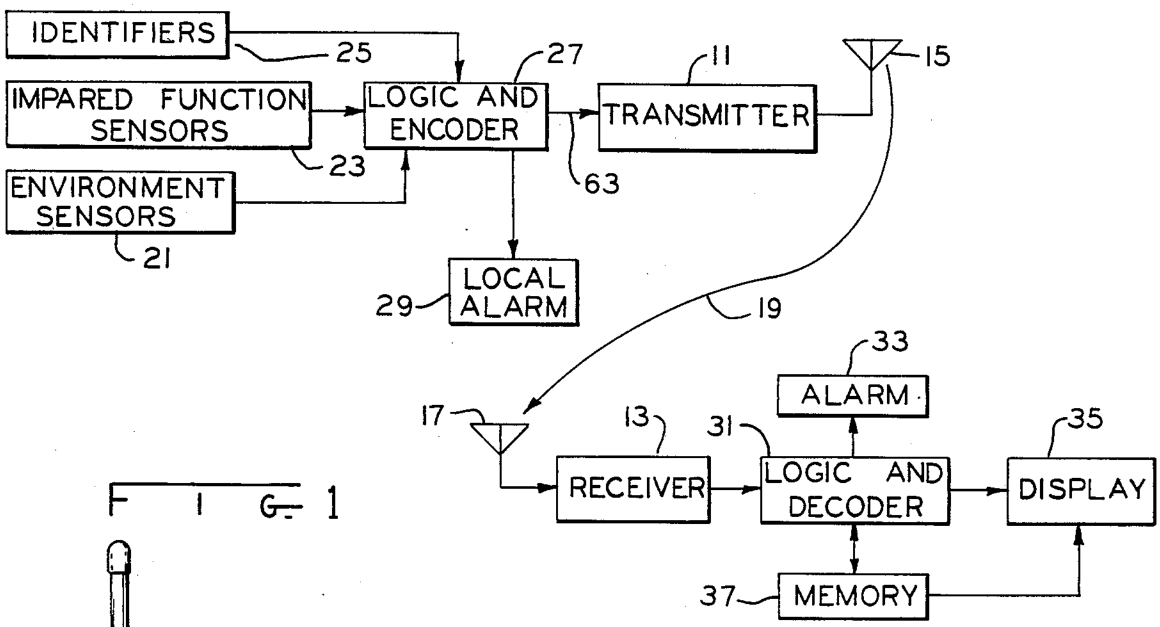
FIG. 1 is a functional block diagram illustrating various concepts of the present invention.
Figure 2:
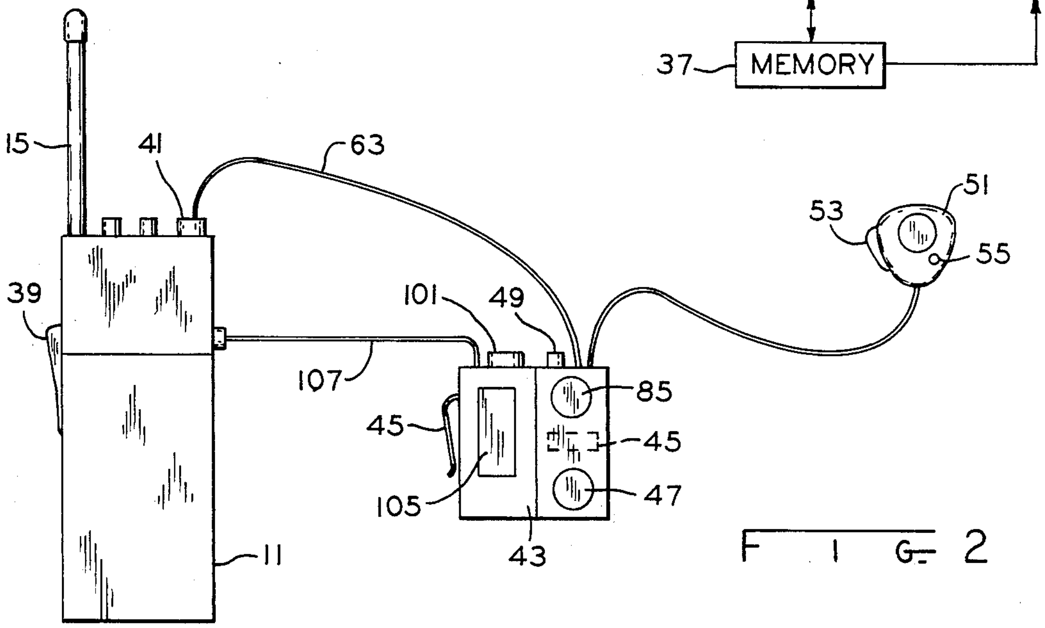
FIG. 2 is a front elevation view of a hand-held transceiver and separate irregularity sensing warning system module connected thereto.
Figure 3:
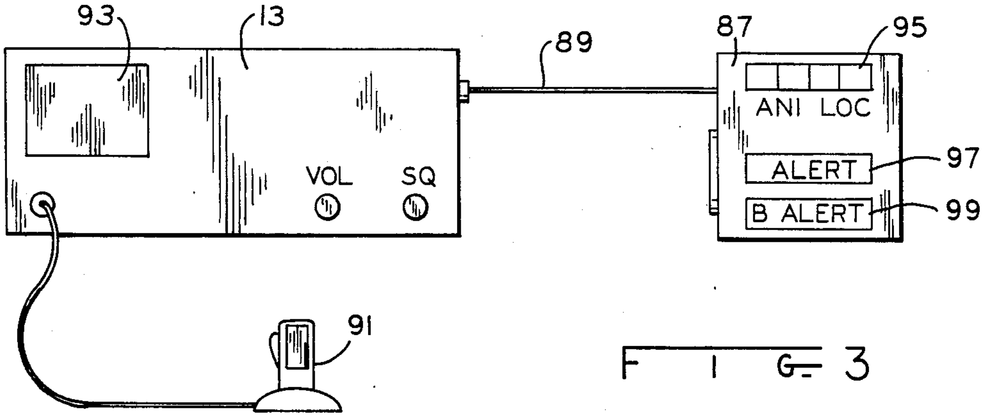
FIG. 3 is a front elevation view of a base station or receiver having a decoder and display module coupled thereto.

In FIG. 1 a voice communication system is indicated generally by a radio frequency transmitter 11 at one site or location and a radio frequency receiver 13 at some other location remote from the location of transmitter 11 with conventional radio communication between the antennas 15 and 17 being illustrated generally by the arrow 19. Conventional two-way communication is contemplated but not required. Transmitter 11 may be a conventional hand-held transceiver such as the GENAVE GHT6 available for Applicant's assignee or an MX320 or similar MX300 series "Handie-Talkie" available from Motorola Communications and Electronics, Inc. of Schaumburg, Ill. as illustrated in FIG. 2 while the receiver 13 may be a conventional base station as illustrated in FIG. 3 or simply another hand-held transceiver of the type illustrated in FIG. 2. The system contemplates monitoring the location of transmitter 11 for irregularities or potentially dangerous conditions typically associated with a person at that transmitter location.

Any one of a wide variety of environment sensors 21 may be located at the transmitter location including, by way of example only, those sensors disclosed in the aforementioned United States Patents. Such environment sensors include, by way of example, radiation detectors, smoke detectors, detectors for determining an abnormally low oxygen content in the atmosphere as well as a wide variety of detectors for hazardous gases such as alcohol, ammonia, carbon monoxide, natural gas and phosgene to name but a few. For example, the device of U.S. Pat. No. 4,350,660 in conjunction with a threshold circuit will provide a satisfactory ammonia gas detector. Any one of the several multi-gas detectors currently employed in combustible gas leak detectors could also be employed. Other hazardous conditions could be associated with some sort of impaired functioning of the individual located at the transmitter location and such impaired function sensors are indicated generally at 23. The impaired function sensors might test the breath of the individual at the transmitter location speaking into a microphone to determine the alcohol content of the individual's breath or could monitor body functions such as pulse rate, respiration rate or movement of a portion of the anatomy such as the individual's eye as described in greater detail in conjuntion with FIGS. 6 and 7. Another impaired function sensor of a somewhat different nature than the previous example is a simple mercury tilt switch which changes state from non-conducting to conducting when the individual assumes a prone position.

Digitally encoded identifiers indicated generally at 25 may also form part of the input at the location being monitored with such identifiers typically indicating either the particular individual being monitored or the particular type environment or impaired function sensor being used or in some cases, other types of information may be included within the identifiers. Identifier and sensor input is combined in logic circuitry 27 so that when one of the sensors 21 or 23 detects an irregular condition, the identifiers 25 are transmitted by way of the communication link 19 to a remote location and a local alarm 29 is enabled to warn the individual at the potentially hazardous site that a potentially dangerous condition has been sensed.

Upon sensing such an irregularity as indicated by the transmission of the identifiers, receiver 13 receives and logic circuitry 31 decodes this information to provide an alarm 33 audibly or visually to an individual at the remote location and to further display, at 35, the information such as the location of the sensed irregularity included within the identifiers. Further information may be stored in a memory 37 for display in conjunction with the identifiers. Memory 37 could, for example, include information about the particular task or location of the individual identified by the identifier code, information about the particular hazard to which that individual might be exposed or could even maintain histories on individuals being monitored such as pulse or respiration rates so that an alarm condition could be enabled in the event that there was an abrupt change in the parameter being monitored. The details of the transmitter portion of the communication link of FIG. 1 are illustrated in greater detail in FIGS. 2 and 4.

A conventional hand-held transceiver 11 includes antenna 15 and a spring belt clip 39 allowing the user to fasten the transceiver to his belt freeing his hands for further activities. This transceiver 11 also includes an external microphone input 41 receiving information from the logic and encoder block 27 of FIG. 1. The separate module or package 43, also including a belt clip 45, may be worn by the individual. Module 43 may include the aforementioned mercury tilt switch 45 providing the aforementioned impaired function sensor indication 23 as well as a hazardous gas detector 47 providing the function of environment sensor 21 of FIG. 1. Module 47 still further includes manually actuable code wheels 49 allowing the user to dial in, for example, 16 bits of information which may include eight bits identifying the particular user or wearer and another eight bits identifying the particular type gas detector 47. Of course, other information might be appropriate to a particular situation. The individual being monitored also carries a conventional hand-held microphone with further belt clip, if desired, and with a conventional press to talk switch 53. Conventional microphone 51 may be modified to include a breathalyzer or alcohol sensor 55, if desired.

With this modification, when the user speaks into the microphone 51, he also exposes the alcohol level sensor 55 to this breath and that sensor functions in its normal manner testing the air exhaled by the individual for an abnormally high alcohol content. Thus, in FIG. 2 where the microphone 51 would normally plug into the connector 41, it is instead plugged into the module 43 and the lead from module 43, in turn, connected to the conventional hand-held microphone inlet 41.

Figure 4:
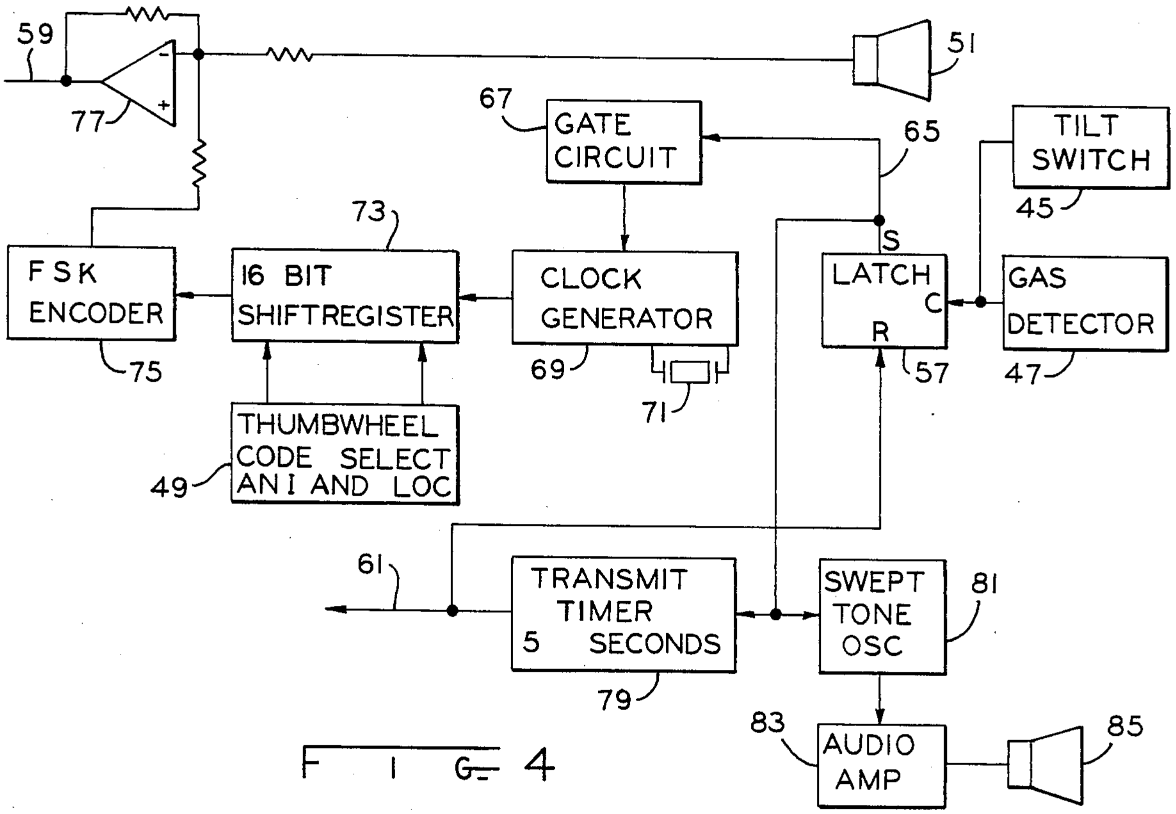
FIG. 4 is a schematic diagram of a gas detector and encoder suitable for incorporation into the module of FIG. 2.

Referring now in greater detail to FIG. 4, output line 59 provides a conventional audio connection to the external microphone connector 41 of FIG. 2 while output line 61 also connected to that terminal and a part of cable 63 connects to the press to talk circuit of the transceiver 11. The inputs to the circuit of FIG. 4 in addition to the conventional hand-held microphone 51 are the aforementioned tilt switch 45 and hazardous gas detector 47. Of course, other or alternative irregularity monitoring transducers could be used as inputs. These various input transducers are coupled to a latch 57 which in its normal or quiescent state provides a first output signal on line 65 which may be thought of as a zero or no signal and when enabled or actuated by one of the transducers changes to a one or high state on line 65 which by way of the gate 67 actuates a clock generator 69, the frequency of which is controlled by crystal 71. This clock generator loads into the sixteen bit shift register 73, the particular pattern of binary digits determined by the particular setting of the code wheels 49 and that particular binary code is used to modulate encoder 75. In particular the encoder 75 may be a frequency shift keying device having an output at one thousand hertz for zeros in the binary code and an output of twelve hundred hertz for ones in the binary code. An EXAR Model 2211 chip is a suitable encoder. This frequency shift encoded information is supplied by way of the operational amplifier 77 to the transceiver for conventional modulation and transmission since both the one thousand and the twelve hundred hertz signals are well within the audio pass band of the communication system.

The hazardous detection which sets latch 57 initiating the foregoing sequence also actuates a timer 79 set, for example, to provide a high output on line 61 for a five second interval actuating the press to talk circuitry of the transmitter. The appropriate choice of logic circuitry allows this signal on line 61 at the termination thereof to re-set latch 57 and, in the event that the transducers are no longer sensing the hazardous condition, transmission of the warning signal terminates. However, should one of the transducers still be detecting the hazardous condition, latch 57 is again set and the warning signal transmitted. The output on line 65 indicative of sensing a hazardous condition also initiates operation of a swept tone oscillator 81 which provides an audible alarm signal by way of the audio amplifier 83 to a small loud speaker 85 also carried in module 43 as illustrated in FIG. 2. Receipt and processing of the frequency shift keying encoded alarm signal at a remote location is illustrated in FIGS. 3 and 5.

In addition to its normal communication function, the base station receiver 13 is coupled to module 87 by way of an external speaker lead 89. Of course, module 87 like module 43 of FIG. 2 could be made integral with the transmitter or receiver but both are illustrated separately as an add-on module for clarity of description. Base station receiver 13 which is typically a transceiver includes a conventional microphone 91 and loud speaker 93 as well as conventional volume and squelch controls or other conventional controls. Module 87 includes a four digit display 95 such as four conventional seven segment light emitting diode display devices. This four digit display will typically indicate the location, type of hazard and/or identify the particular individual associated with an alarm condition. Module 87 further includes a flashing alert display 97 which indicates to an individual at the base station that some sort of alarm condition exists as well as a further alert display 99 which may, for example, indicate a possible state of inebriation of an individual speaking into a microphone at the transmitter location. An additional warning indication that a potentially hazardous condition has been sensed may be audibly sounded at the base station by way of speaker 93, module speaker 115 or otherwise, if desired.

Functions similar to those of module 87 may also be received at other than a base station i.e. by other individuals within a communication net and thus may be incorporated into each of the units of the type illustrated in FIG. 2. Thus, in FIG. 2, the four digit display 101 corresponds to display 95 of FIG. 3 and a special alert output speaker 105 may be provided to indicate that a hazardous condition has been sensed by another individual within the communication net. In either case, the general approach to receiving decoding and displaying an alert or warning indication is depicted in FIG. 5.

Figure 5:
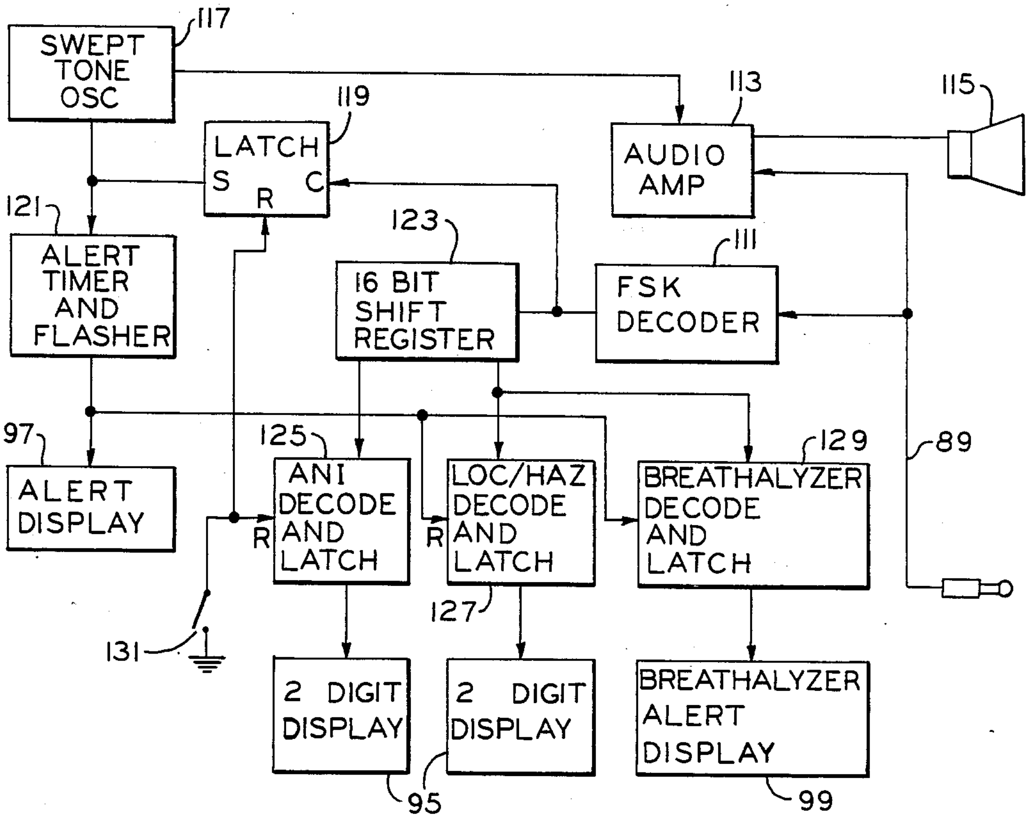
FIG. 5 is a schematic diagram of a decoder suitable for incorporation into the module of FIG. 3.

In the FIG. 5, the output from an FM detector corresponding to either line 89 of FIG. 3 or line 107 of FIG. 2, is supplied to a frequency shift keying decoder 111 as well as to audio amplifier 113. This signal to the audio amplifier 113 may, of course, be conventional speech, in turn, supplied to speaker 115 under normal communication conditions or if the warning indication is detected by decoder 111, the audio output may be a "yelping" alarm as supplied by the swept tone oscillator 117.

The frequency shift keying decoder 111, upon detection of an alarm condition, sets latch 119 triggering the alarm oscillator 117 and also triggering the alert flasher timing control 121. Timer 121, in turn, enables the alert display 97 of FIG. 3 which will continue to display the alert condition until timer 121 times out. The output of decoder 111 is also supplied to a sixteen bit shift register 123 and that serial binary code is, in turn, supplied in parallel to binary to decimal decoders 125 and 127 and a similar decoder and latch circuit 129 for display of the particular information involved. Upon expiration of the fixed time for timer 121, latches 127 and 129 are reset expunging the information on their respective displays and further a manual reset switch 131 for decoder 125 and latch 119 may be provided. Actuation of reset switch 131, by way of latch 119 and alarm timer 121, also supplies reset signals to latches 127 and 129.

Figure 6:
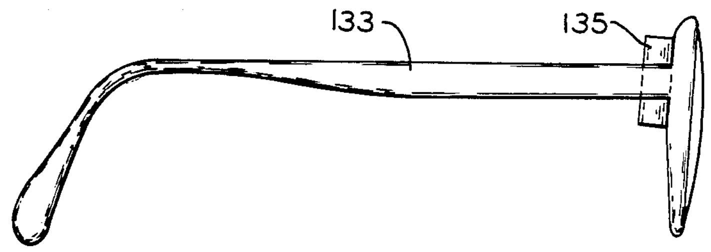
FIG. 6 is a side elevation view of a conventional pair of spectacles such as safety glasses with an eye movement detector mounted thereon.
Figure 7:
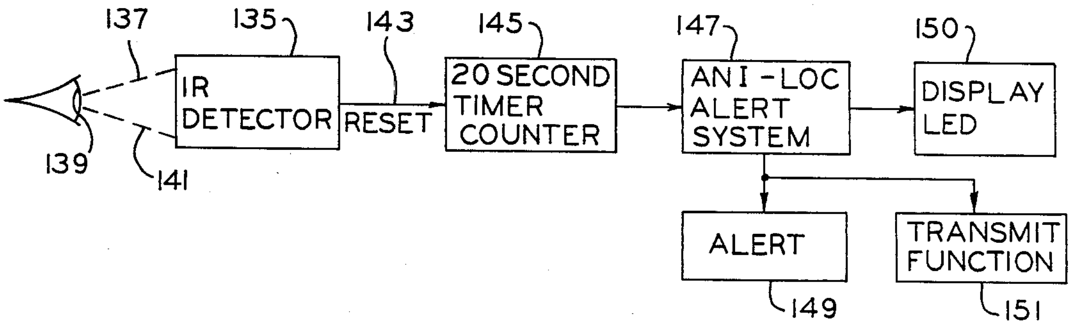
FIG. 7 is a schematic diagram illustrating circuitry used in conjunction with the detector of FIG. 6 for monitoring eye movement and providing an alarm or warning indication indicative of potential unconsciousness of the wearer of the spectacles of the FIG. 6.

A wide variety of impaired function or environment sensors have been suggested and others will occur to the reader. As one further, and somewhat different example, consciousness of an individual may be monitored by an eye motion detection arrangement illustrated in FIGS. 6 and 7. In FIG. 6, a pair of safety glasses 133 have mounted thereon a small infrared radiation source and radiation detector element 135 so as to be in reasonably close proximity to the wearer's eye. For example, the element 135 may be located closely adjacent the hinge joining the temple and front portion of the safety glasses' frame. Other types of eye wear, visors and the like could be employed to mount the element 135 so long as that element is positioned so as to provide radiation from the source along line 137 of FIG. 7 with that radiation being reflected from the surface of the eye 139 and back along path 141 to the detector portion of the element 135. Element 135, which is a commercially available device such as the Hewlett Packard HEDS-1000 High Resolution Optical Reflective Sensor, has its radiation source and radiation detector shielded from one another so that the detector is not responsive to any direct radiation from the source or ambient lighting but rather is dependent upon the indirect radiation path which as here illustrated includes the eye surface 139 of the human anatomy. As illustrated, movement of eye 139 or blinking of the eye will vary the radiation reflected back along line 141 to the infrared detector and this variation provides a reset signal on line 143 to a timer or counter 145 initializing the count thereon. Thus, counter 145 does not provide an output unless the radiation detected remains uniform over the time span of the counter. In a preferred embodiment, this time span is about twenty seconds since humans normally blink several times in this time span. Lack of eye movement for over a twenty second interval could be indicative of an unconscious state of the individual and upon the expiration of that twenty seconds without any movement indicative reset on line 143, the timer 145 provides an output signal to the alert system 147 and optionally also to a light emitting diode display element 150 and alarm system 147 thereupon functions much as earlier described in conjunction with FIG. 4 providing an audible signal at the location of the wearer by way of an alert output speaker 149 analogous to speaker to 105 in FIG. 2, as well as transmitting this lack of eye movement indication to a remote location such as the base station of FIG. 3 as indicated by block 151.

From the foregoing, it is now apparent that a novel, hazardous or impaired function sensing and reporting scheme suitable for incorporation into existing voice communication networks has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. An arrangement for monitoring for potentially dangerous conditions associated with a person at one end of a two-way radio voice communication system and for reporting the existence of a particular potentially dangerous condition to another end of the system comprising:

at least one condition sensor at said one system end for providing an indication of at least one of, a hazardous environment at said one system end and an impaired functioning of the person at said one system end;

means at said one system end for selectively providing a digital signal identifying said one system end;

means including a portable transceiver at said one system end for sending at least the identifying signal by way of the voice communication system to said another end upon detection of a potentially dangerous condition by said sensor;

local alarm means for warning the person at said one communication system end when the one sensor detects a potentially dangerous condition and;

a microphone coupled to the transceiver, the one condition sensor comprising an alcohol sensitive transducer mounted closely adjacent the microphone and responsive to excess alcohol content in the air adjacent the microphone as the one person speaks into the microphone to provide a potentially dangerous inebriation condition indication.

2. In a voice communication system including a microphone at a transmit location, an alcohol sensitive transducer mounted closely adjacent the microphone to monitor the breath of a microphone user as he speaks into the microphone and to provide an output indication enabling a transmission over the voice communication system when the transducer senses an alcohol concentration above a predetermined threshold, and means at the transmit location responsive to the transducer output indication for providing a digital indication unique to the particular transmit location for transmission over the voice communication system.

3. An arrangement for monitoring the conscious state of an individual and for providing an alarm in the event an unconscious condition of the individual is detected comprising:

a radiation source;

a radiation detector located closely adjacent the source and shielded therefrom so as to be unresponsive to any direct radiation from the source;

an indirect radiation path from the source to the detector including a portion of the individual's anatomy comprising an eye of the individual where movement of the anatomy portion varies the radiation received by the detector, the radiation source and detector being supported near the individual's eye to monitor eye and eye lid movement;

means coupled to the radiation detector and responsive to a steady indication from the detector for a predetermined time interval indicative of uniform radiation due to lack of movement of the anatomy portion during the predetermined time interval for providing an alarm indication; and a portable radio transceiver carried by the individual and coupled to the means for providing an alarm indication to transmit the alarm indication to a remote location.

4. The arrangement of claim 3 wherein the predetermined time interval is about twenty seconds.

5. The arrangement of claim 3 wherein the means for providing an alarm indication provides an audible alarm in the vicinity of the individual being monitored.

6. The arrangement of claim 3 wherein the means for providing an alarm indication further includes means for generating a digital identification signal in the form of an eight bit binary code unique to the particular individual being monitored, and means comprising a frequency shift keying encoder for frequency encoding the digital identification signal for transmission by the portable radio transceiver to the remote location, and further including at the remote location, a radio receiver, a frequency shift keying decoder, digital means coupled to the decoder for receiving therefrom the digital identification signal, and display means coupled to the digital means for providing a visible identification of the source of the sensed irregularity.

7. The arrangement of claim 6 further including, at the remote location, audible warning means enabled upon receipt of an alarm indication to audibly indicate an unconscious condition has been sensed.

8. An arrangement for monitoring for potentially dangerous conditions associated with a person at one end of a two-way radio voice communication system and for reporting the existence of a particular potentially dangerous condition to another end of the system comprising:

at least one condition sensor at said one system end for providing an indication of at least one of, a hazardous environment at said one system end and an impaired functioning of the person at said one system end, the one condition sensor comprising an infrared source, an infrared sensor, and an infrared radiation path from the source to the sensor including a portion of the anatomy of the person at said one system end with movement of the anatomy portion varying the radiation received by the sensor;

means at said one system end for selectively providing a digital signal identifying said one system end;

means including a portable transceiver at said one system end for sending at least the identifying signal by way of the voice communication system to said another end upon detection of a potentially dangerous condition by said sensor;

local alarm means for warning the person at said one communication system end when the one sensor detects a potentially dangerous condition;

means for determining the lapse of a predetermined time interval and upon expiration thereof to actuate the means for sending, and means responsive to radiation variations received by the sensor to reset the means for determining to an initial state thereby precluding sending of the identifying signal so long as movement of the anatomy portion occurs before expiration of the predetermined time interval.

9. The arrangement of claim 8 wherein the predetermined time interval is about twenty seconds and the anatomy portion is the person's eye.

* * * * *